(12) United States Patent
Niu et al.

(10) Patent No.: US 9,331,834 B2
(45) Date of Patent: May 3, 2016

(54) CHANNEL BANDWIDTH DETECTION

(71) Applicant: Amlogic Co., Ltd., Santa Clara, CA (US)

(72) Inventors: Jin Niu, Shanghai (CN); Guogang Li, Shanghai (CN)

(73) Assignee: Amlogic Co., Limited, Hong Kong (HK)

( * ) Notice: Subject to any disclaimer, the term of this patent is extended or adjusted under 35 U.S.C. 154(b) by 150 days.

(21) Appl. No.: 14/045,749

(22) Filed: Oct. 3, 2013

(65) Prior Publication Data

US 2015/0098344 A1    Apr. 9, 2015

(51) Int. Cl.
*H04J 3/24* (2006.01)
*H04L 5/00* (2006.01)
*H04L 27/26* (2006.01)

(52) U.S. Cl.
CPC .......... *H04L 5/0064* (2013.01); *H04L 27/2666* (2013.01); *H04L 5/0007* (2013.01)

(58) Field of Classification Search
CPC ...... H04L 1/20; H04L 25/0216; H04L 27/266

USPC .......... 375/343, 150; 370/210, 334, 204, 344, 370/480
See application file for complete search history.

(56) References Cited

U.S. PATENT DOCUMENTS

| | | | | |
|---|---|---|---|---|
| 6,408,107 | B1 * | 6/2002 | Miller et al. | 382/294 |
| 7,088,787 | B2 * | 8/2006 | Wang et al. | 375/316 |
| 8,879,472 | B2 * | 11/2014 | Porat | 370/328 |
| 2004/0110510 | A1 * | 6/2004 | Jeon et al. | 455/450 |
| 2005/0152317 | A1 * | 7/2005 | Awater et al. | 370/338 |
| 2005/0233709 | A1 * | 10/2005 | Gardner et al. | 455/101 |
| 2010/0061402 | A1 * | 3/2010 | van Zelst et al. | 370/474 |

\* cited by examiner

*Primary Examiner* — Dang Ton
*Assistant Examiner* — Sai Aung
(74) *Attorney, Agent, or Firm* — Venture Pacific Law, PC

(57) ABSTRACT

A method for detecting a channel bandwidth for a signal, comprises the steps of: determining a differential operator between carriers of the signal; determining a signal power for the signal; and detecting the channel bandwidth as a function of the determined differential operator and the determined signal power, wherein the signal is processed as a function of the detected channel bandwidth.

16 Claims, 3 Drawing Sheets

CHANNEL BANDWIDTH DETECTION

FIELD OF INVENTION

This invention relates to wireless communications, and, in particular, to methods for channel bandwidth detection for wireless local area networks ("WLAN").

BACKGROUND

WLAN systems are ubiquitously used in today's communications systems, and, in particular, are used to connect mobile devices to the internet via an access point. The mobile devices can freely move in a local coverage, while still being connected to the WLAN via wireless distribution methods, e.g., by orthogonal frequency division multiplexing ("OFDM") signals. WLAN systems have become popular due to its ease of installation and use.

Most modern WLAN systems are based on IEEE 802.11 standards, and marketed under the mark "Wi-Fi". In particular, the 802.11a, 802.11n, 802.11ac, etc. standards are specific WLAN standards for band transmissions using OFDM signals. In some of these 802.11 standards, each channel is 20 MHz wide (or multiples of two thereafter), and the center frequencies of adjacent channels are 20 MHz apart (or multiples of two thereafter).

FIG. 1 illustrates channelization for the IEEE 802.11a, n, and ac standards. For the 802.11a standard, channels 10 can have a channel bandwidth of up to 20 MHz. For the 802.11n standard, channels 12 can have a channel bandwidth of up to 40 MHz. For the 802.11ac standard, channels 14 and 16 can have a channel bandwidth of up to 80 MHz or 160 MHz. Also, for the 802.11ac standard, adjacent 20 MHz subchannels can be grouped into pairs to make 40 MHz channels, and then adjacent 40 MHz subchannels can be grouped into pairs to make 80 MHz channels. Additionally, adjacent 80 MHz subchannels can be grouped into pairs to make the 160 MHz channels. Using a wider channel bandwidth can advantageously increase capacity, i.e., the transfer rate from a transmitter to a receiver. For instance, a 40 MHz channel has greater capacity than a 20 MHz channel, and so on.

As older and newer WLAN standards are concurrently used, devices (e.g., laptops, tablets, mobile phones, etc.) must be able to distinguish the various WLAN standards and channel bandwidth size. Accordingly, it is important to accurately determine the bandwidth between communicating devices. Current systems and devices typically rely on default bandwidth settings and/or query a user at application start-up to identify the bandwidth of their local system. However, most users do not know the bandwidth associated with their communications system. Thus, it would be beneficial to provide a mechanism to automatically detect the channel bandwidth of a communications system.

SUMMARY OF INVENTION

An object of this invention is to provide efficient and reliable methods and systems for channel bandwidth detection.

Another object of this invention is to provide methods and systems for channel bandwidth detection that can resist large frequency offset.

Yet another object of this invention is to provide methods and systems for channel bandwidth detection by using a differential operator between carriers of the signal.

Briefly, the present invention discloses methods and systems for detecting a channel bandwidth for a signal, comprises the steps of: determining a differential operator between carriers of the signal; determining a signal power for the signal; and detecting the channel bandwidth as a function of the determined differential operator and the determined signal power, wherein the signal is processed as a function of the detected channel bandwidth.

An advantage of this invention is that efficient and reliable methods and systems for channel bandwidth detection are provided.

Another advantage of this invention is that methods and systems for channel bandwidth detection that can resist large frequency offset are provided.

Yet another advantage of this invention is that methods and systems for channel bandwidth detection of a signal using a differential operator between carriers of the signal are provided.

DESCRIPTION OF THE DRAWINGS

The foregoing and other objects, aspects, and advantages of the invention can be better understood from the following detailed description of the preferred embodiment of the invention when taken in conjunction with the accompanying drawings in which.

DETAILED DESCRIPTION OF THE PREFERRED EMBODIMENTS

In the following detailed description of the embodiments, reference is made to the accompanying drawings, which form a part hereof, and in which is shown by way of illustration of specific embodiments in which the present invention may be practiced. The following illustrations provide an example for determining whether a 20 MHz or 40 MHz channel bandwidth is used for a WLAN signal. However, it is understood by a person having ordinary skill in the art that the present invention can be applied for determining a channel bandwidth for any number of WLAN standards and for more than two channel bandwidths.

Typically, a transmitter, e.g., an access point, can use a 20 MHz channel bandwidth or a 40 MHz channel bandwidth to transmit a signal to a receiver, e.g., a laptop or mobile phone. The transmitter can dynamically change the channel bandwidth based upon the availability of the 40 MHz bandwidth. Thus, the receiver must detect whether the signal is transmitted via a 20 MHz channel or a 40 MHZ channel.

Figure 1:
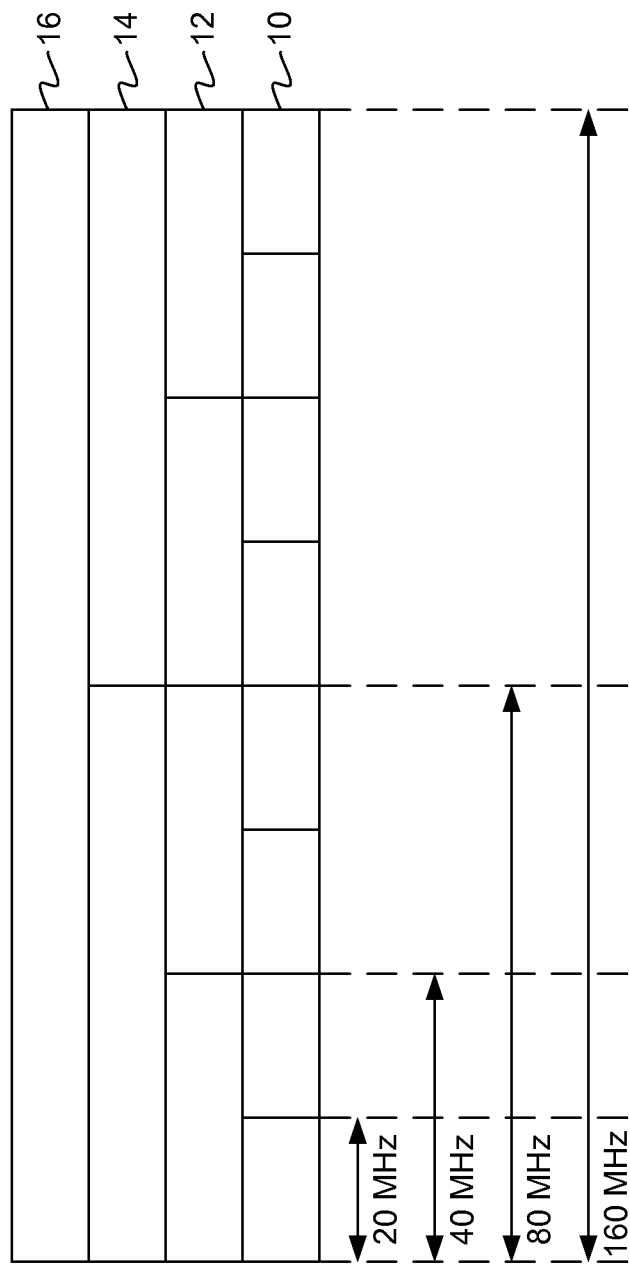
FIG. 1 illustrates channelization of IEEE 802.11 standards.
Figure 2:
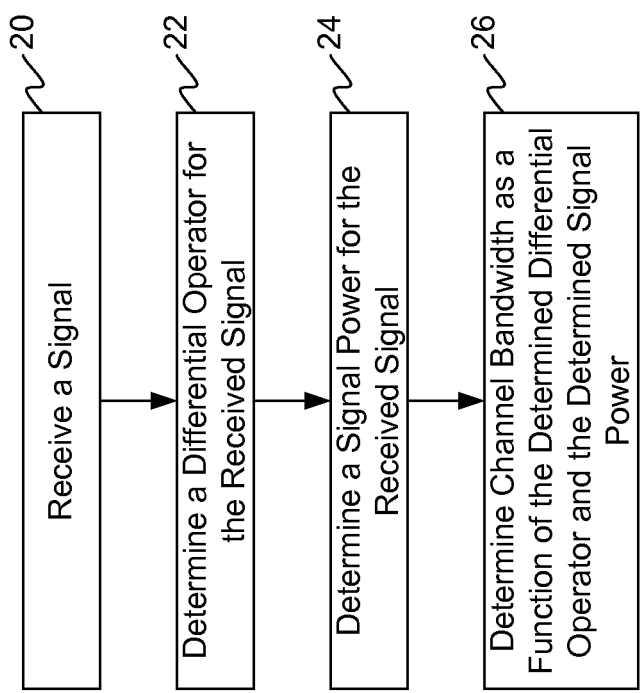
FIG. 2 illustrates a flow chart of the present invention for channel bandwidth detection.

FIG. 2 illustrates a flow chart of the present invention for channel bandwidth detection for a signal. First, a signal is received 20 by a receiver for processing. Typically, a Fast Fourier Transform ("FFT") is applied to the signal to obtain the signal in the frequency domain, y(k), where k is the frequency carrier number. The receiver can apply a differential operator between carriers for a predefined number of samples of the signal y(k). The receiver can also determine a signal power of the received signal 24 for the predefined number of samples of the signal y(k).

To optimize performance and channel bandwidth detection, typically 64 samples of the signal y(k) can be used for determining the signal power and a differential operator between carriers of the signal. Thus, the differential operator diff[k] can equal:

$$\text{diff}[k]=y[k]*y[k+32]*, \text{ for } k=[0,31] \qquad \text{Equation [1]}$$

In this manner, a first half of the FFT transformed samples of the signal and a second half of the FFT transformed samples of the signal are combined to obtain the differential operator diff[k].

The signal power $P_y[k]$ can equal:

$$P_y[k]=y[k]*y[k]^*, \text{ for } k=[0,63]. \quad \text{Equation [2]}$$

It is understood by a person having ordinary skill in the art that other numbers of samples can be used depending on performance needs and system requirements. For instance, 32 samples of the signal can be used; 128 samples of the signal can be used; and other numbers of samples of the signal can be used.

The channel bandwidth can be determined as a function of the determined differential operator diff[k] and the determined signal power $P_y[k]$ 26. A differential sum $S_{diff}$ of the differential operator diff[k] for k=0, 1, 2, . . . 31 can be calculated by the following equation:

$$S_{diff}=\Sigma_{k=0}^{31}\text{diff}[k]. \quad \text{Equation [3]}$$

A power sum $S_y$ of the signal power $P_y[k]$ for k=0, 1, 2, . . . 63 can be calculated by the following equation:

$$S_y=\Sigma_{k=0}^{63}(y[k]*y[k]^*). \quad \text{Equation [4]}$$

Next, the differential sum can be squared and the power sum can be squared. The squared differential sum can be divided by the squared power sum to provide a quality indication value Q, as follows:

$$Q = \frac{S_{diff} \cdot S_{diff}^*}{S_y \cdot S_y}. \quad \text{Equation [5]}$$

The quality indication value can be compared against a threshold value to determine whether the signal has a 40 MHz channel bandwidth or a 20 MHz channel bandwidth. The general threshold value can be determined based on the worst case scenario of the reception of the signal. Major factors for determining the general threshold value can be the signal-to-noise ratio and any frequency offset. Generally, if the signal is noise free then the quality indication is equal to 1. In the worst case scenario, the quality indication is around 0.1 to 0.2. However, for most cases, the quality indication is around 0.4 to 0.8.

If there are more than one possible channel bandwidths, then there can be several other threshold values for determining whether the actual channel bandwidth of the signal falls within one of the possible channel bandwidths.

Alternatively, if there are three possible bandwidth values, e.g., 40M/80M/160M, at the same time, then three Qs can be calculated, one Q for each of the possible bandwidths. The maximum Q value can be compared to the threshold value. If the maximum Q is greater than the threshold value, then the respective bandwidth of the maximum Q value is selected.

Figure 3:
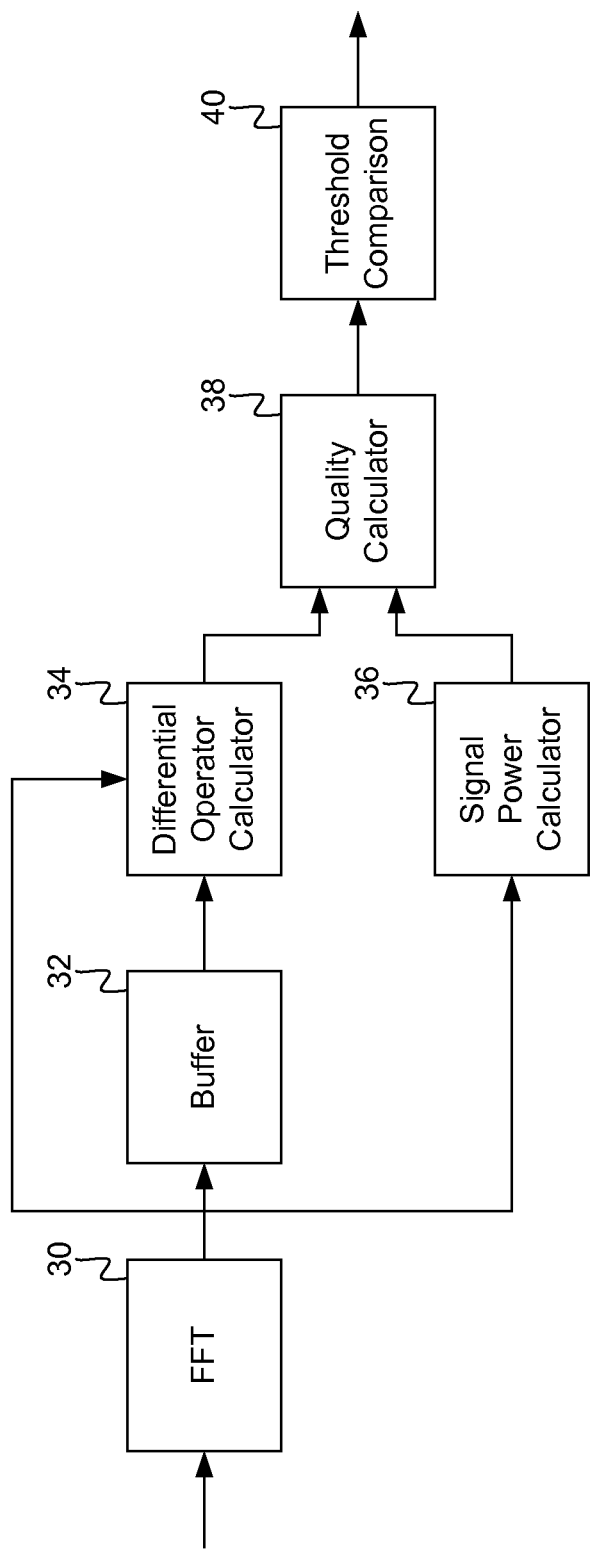
FIG. 3 illustrates a block diagram of the present invention for channel bandwidth detection.

FIG. 3 illustrates a block diagram of the present invention for channel bandwidth detection. A channel bandwidth detector of the present invention comprises a FFT block 30, a buffer 32, a differential operator calculator 34, a signal power calculator 36, a quality calculator 38, and a threshold comparison block 40. A predefined number of samples (e.g., 64 samples) of a signal is inputted to the FFT block 30 for processing. The FFT block 30 can apply a Fast Fourier Transform on the predefined number of samples to transform the signal into the frequency domain.

The FFT transformed signal is inputted to the buffer 32, differential operator calculator 34, and the signal power calculator 36. The buffer 32 delays half of the predefined number of samples of the signal, before outputting the buffered samples to the differential operator calculator 34. The differential operator calculator 34 calculates the differential operator diff[k] according to Equation [1]. Next, the differential sum $S_{diff}$ of the differential operator diff[k] for k=0, 1, 2, . . . 31 can be calculated by the differential operator calculator 34 according to Equation [3]. The differential sum can then be squared. The squared differential sum $|S_{diff}|^2$ can then be outputted to the quality calculator block 38.

The signal power calculator 36 can calculate the signal power $P_y[k]$ according to Equation [2]. The power sum $S_y$ for the signal power $P_y[k]$ for k=0, 1, 2, . . . 63 can be calculated according to the Equation [4]. The power sum $S_y$ can then be squared. The squared power sum $|S_y|^2$ can then be outputted to the quality calculator block 38.

The quality calculator block 38 divides the squared power sum $|S_y|^2$ into the squared differential sum $|S_{diff}|^2$ to obtain a quality value ("Q"). The threshold comparison block 40 then compares the quality value to a threshold value(s) to determine the channel bandwidth for the signal.

While the present invention has been described with reference to certain preferred embodiments or methods, it is to be understood that the present invention is not limited to such specific embodiments or methods. Rather, it is the inventor's contention that the invention be understood and construed in its broadest meaning as reflected by the following claims. Thus, these claims are to be understood as incorporating not only the preferred apparatuses, methods, and systems described herein, but all those other and further alterations and modifications as would be apparent to those of ordinary skilled in the art.

We claim:

1. A method for detecting a channel bandwidth for a signal, comprising the steps of:
    determining a differential operator between carriers of the signal;
    determining a signal power for the signal; and
    detecting the channel bandwidth as a function of the determined differential operator and the determined signal power,
    wherein the signal is processed as a function of the detected channel bandwidth,
    wherein a quality value is determined as a function of the determined differential operator and the determined signal power,
    wherein a quality value is determined as a function of the determined differential operator and the determined signal power,
    wherein the quality value is compared with one or more predefined threshold values to determine the channel bandwidth for the signal,
    wherein the quality value ("Q") is equal to the following:

$$Q = \frac{S_{diff} \cdot S_{diff}^*}{S_y \cdot S_y},$$

wherein $S_{diff}$ is a summed differential operator, wherein $S_{diff}^*$ is the conjugate of the summed differential operator, and wherein Sy is the summed signal power.

2. The method of claim 1 wherein a predefined number of samples of the signal are transformed using a FFT transform and wherein the determined differential operator is determined based upon the FFT transformed samples of the signal.

3. The method of claim 2 wherein a first half of the FFT transformed samples of the signal and a second half of the FFT transformed samples of the signal are combined to determine the determined differential operator.

4. The method of claim 3 wherein the determined differential operator is summed ("$S_{diff}$") as follows:

$$S_{diff} = \sum_{k=0}^{31} y[k] * y[k+32]^*$$

wherein the y[k] function is the FFT transformed samples of the signal and the predefined number of samples of the signal is equal to 64 and wherein the y[k+32]* function is a complex conjugate of the y[k] function.

5. The method of claim 1 wherein a predefined number of samples of the signal are transformed using a FFT transform and wherein the determined signal power is determined based upon the FFT transformed samples of the signal.

6. The method of claim 5 wherein signal power values for each of the FFT transformed samples of the signal are determined and wherein the signal power values are summed.

7. The method of claim 6 wherein the summed signal power values ("Sy") are obtained by multiplying the signal at a certain sampling point with a conjugate signal at a certain sampling point.

8. The method of claim 7 wherein the summed signal power values are equal to the following:

$$S_y = \sum_{k=0}^{63} (y[k] * y[k]^*)$$

wherein the y[k] function is the FFT transformed samples of the signal and the predefined number of samples of the signal is equal to 64 and wherein the y[k]* function is a complex conjugate of the y[k] function.

9. A method for detecting a channel bandwidth for a signal by a receiver, comprising the steps of:
determining a differential operator between carriers of the signal, wherein a predefined number of samples of the signal are transformed using a FFT transform, wherein the determined differential operator is determined based upon the FFT transformed samples of the signal, and wherein a first half of the FFT transformed samples of the signal and a second half of the FFT transformed samples of the signal are combined to determine the determined differential operator;
determining a signal power for the signal; and
detecting the channel bandwidth as a function of the determined differential operator and the determined signal power,
wherein the signal is processed by the receiver as a function of the detected channel bandwidth,
wherein the determined differential operator is summed ("$S_{diff}$") as follows:

$$S_{diff} = \sum_{k=0}^{31} y[k] * y[k+32]^*$$

wherein the y[k] function is the FFT transformed samples of the signal and the predefined number of samples of the signal is equal to 64, and wherein y[k+32]* function is a complex conjugate of the y[k] function.

10. The method of claim 9 wherein a predefined number of samples of the signal are transformed using a FFT transform and wherein the determined signal power is determined based upon the FFT transformed samples of the signal.

11. The method of claim 10 wherein signal power values for each of the FFT transformed samples of the signal are determined and wherein the signal power values are summed.

12. The method of claim 11 wherein the summed signal power values ("Sy") are obtained by multiplying the signal at a certain sampling point with a conjugate signal at a certain sampling point.

13. The method of claim 12 wherein the summed signal power values are equal to the following:

$$S_y = \sum_{k=0}^{63} (y[k] * y[k]^*)$$

wherein the y[k] function is the FFT transformed samples of the signal and the predefined number of samples of the signal is equal to 64 and wherein the y[k]* function is a complex conjugate of the y[k] function.

14. The method of claim 9 wherein a quality value is determined as a function of the determined differential operator and the determined signal power, and wherein the quality value is compared with one or more predefined threshold values to determine the channel bandwidth for the signal.

15. The method of claim 14 wherein the quality value ("Q") is equal to the following:

$$Q = \frac{S_{diff} \cdot S_{diff}^*}{S_y \cdot S_y}$$

wherein $S_{diff}$ is a summed differential operator, wherein $S_{diff}^*$ is the conjugate of the summed differential operator, and wherein Sy is the summed signal power.

16. A method for detecting a channel bandwidth for a signal by a receiver, comprising the steps of:
determining a differential operator between carriers of the signal, wherein a predefined number of samples of the signal are transformed using a FFT transform, wherein the determined differential operator is determined based upon the FFT transformed samples of the signal, wherein a first half of the FFT transformed samples of the signal and a second half of the FFT transformed samples of the signal are combined to determine the determined differential operator, wherein the determined differential operator is summed ("$S_{diff}$") as follows:

$$S_{diff} = \Sigma_{k=0}^{31} y[k]^* y[k+32]^*,$$

wherein the y[k] function is the FFT transformed samples of the signal and the predefined number of samples of the signal is equal to 64, and wherein the y[k+32]* function is a complex conjugate of the y[k] function;
determining a signal power for the signal, wherein a predefined number of samples of the signal are transformed using a FFT transform, wherein the determined signal power is determined based upon the FFT transformed samples of the signal, wherein signal power values for each of the FFT transformed samples of the signal are determined, wherein the signal power values are summed, wherein the summed signal power values are equal to the following:

$$S_y = \Sigma_{k=0}^{63}(y[k]*y[k]^*),$$

wherein the y[k] function is the FFT transformed samples of the signal and the predefined number of samples of the signal is equal to 64, and wherein the y[k]* function is a complex conjugate of the y[k] function; and detecting the channel bandwidth as a function of the determined differential operator and the determined signal power, wherein the signal is processed by the receiver as a function of the detected channel bandwidth, wherein a quality value is determined as a function of the determined differential operator and the determined signal power, wherein the quality value is compared with one or more predefined threshold values to determine the channel bandwidth for the signal, wherein the quality value ("Q") is equal to the following:

$$Q = \frac{S_{diff} \cdot S_{diff}^*}{S_y \cdot S_y},$$

and wherein, $S_{diff}$ is a summed differential operator, wherein $S_{diff}^*$ is the conjugate of the summed differential operator, and wherein Sy is the summed signal power.

* * * * *